UNITED STATES PATENT OFFICE.

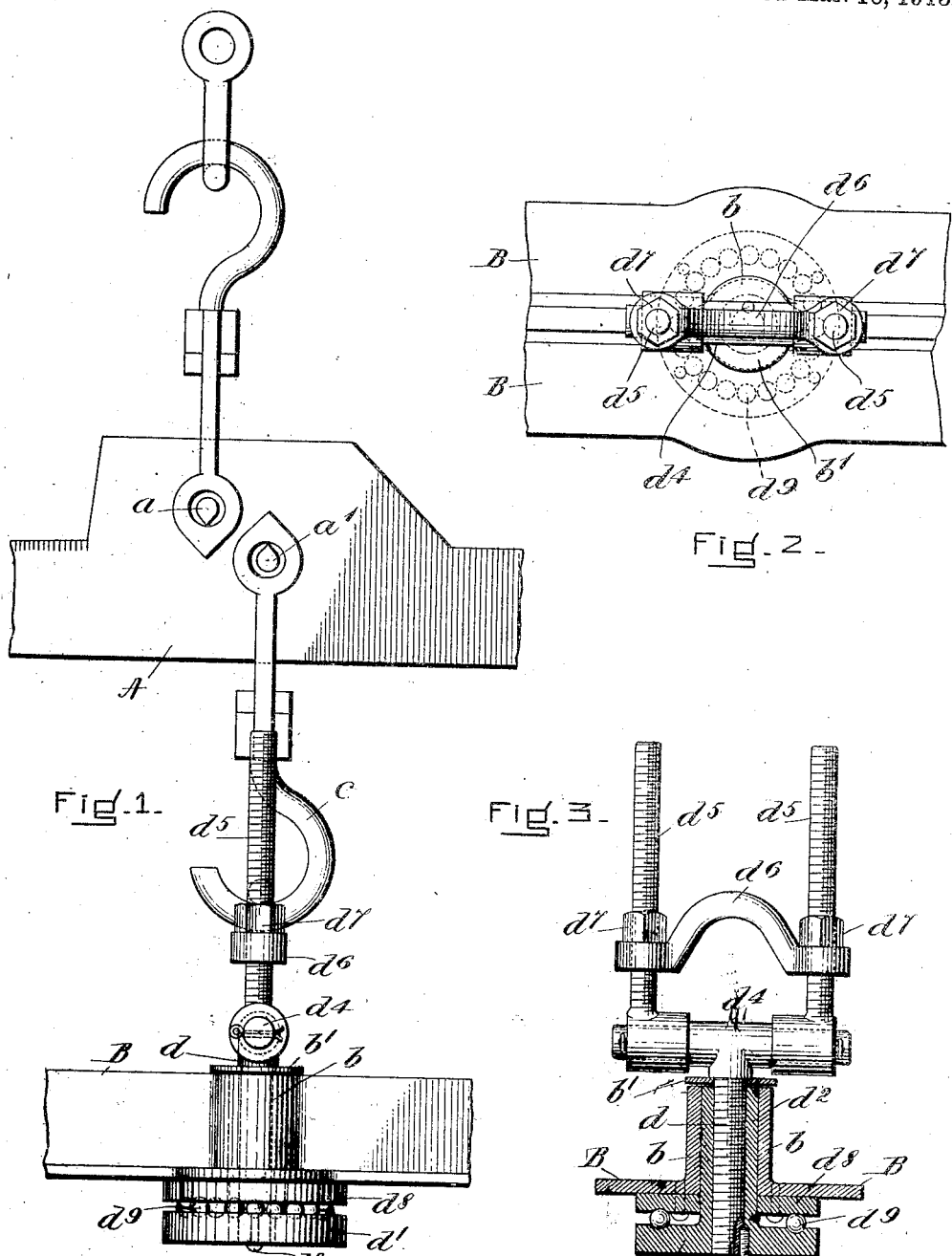

THEODORE L. KEPPLER, OF BROOKLINE, MASSACHUSETTS, ASSIGNOR TO AMERICAN SUGAR REFINING COMPANY, OF BOSTON, MASSACHUSETTS, A CORPORATION OF NEW JERSEY.

SCALE.

1,056,281.   Specification of Letters Patent.   Patented Mar. 18, 1913.

Application filed February 29, 1912. Serial No. 680,712.

*To all whom it may concern:*

Be it known that I, THEODORE L. KEPPLER, a citizen of the United States, and resident of Brookline, in the county of Norfolk and State of Massachusetts, have invented new and useful Improvements in Scales, of which the following is a specification.

This invention relates to scales, and more particularly to the hanger by which the scale platform or scale pan is suspended from the scale beam; and one of the principal objects of the invention is to provide a hanger which will permit the scale platform or scale pan freely to revolve relatively to the scale beam without exerting any appreciable twist on the pivots by which the scale beam and platform are suspended.

Other features of the invention will be hereinafter more particularly described and pointed out in the claims.

The invention is especially designed for use in scales of the kind described in Letters Patent issued to me December 13, 1910, No. 978,306. In scales of this sort provision is made for lowering the scale beam and the scale platform together until the platform rests on the floor, to enable a loaded truck to be rolled directly on to the scale platform, after which the scale beam and platform are lifted bodily clear of the floor to weigh the load. During the lifting and lowering of the scale beam and platform, the platform frequently tends to revolve or twist slightly with relation to the scale beam, with the result that the knife edge pivots by which the scale beam is suspended from its support, and by which the scale platform is suspended from the scale beam, are subjected to wear which soon dulls them, and so affects the accuracy of the scale, and requires frequent sharpening or renewal of the knife edge pivots. Furthermore, should it be desired to roll the load on or off the scale platform at an acute angle, instead of in a direction directly at right angles with the scale beam, only a slight degree of revolution or twist could be given the scale platform in the construction shown in my said former patent, and such twist would be even more detrimental to the aforesaid knife edge pivots than would be the accidental twist above referred to.

In order to permit the free twisting or revolution of the scale platform with relation to the scale beam, without injury to the knife edge pivots, I have provided a hanger having a swivel bearing by which the scale platform is suspended from the scale beam.

In the accompanying drawings, which illustrate one embodiment of the invention,—Figure 1 is a side view of a hanger containing my invention and showing only such parts of the scale beam and platform frame as are necessary to a clear understanding of the device; Fig. 2 is a plan view of said hanger; and Fig. 3 is an elevation thereof viewed at right angles to Fig. 1.

A is a fragmentary view of a scale beam of usual construction having the knife edge pivot pins $a$ and $a'$, the former supporting the scale beam in the usual way from suitable supports, and the latter supporting the depending scale platform. The top member of the platform frame as herein shown consists of two angle iron bars B, B. As ordinarily constructed, the top frame member is supported from the knife edge pivot $a'$ by a hook or loop $c$ which engages a ring or loop on the platform frame as illustrated in the drawing of my said former patent.

In order to permit the scale platform to revolve relatively to the scale beam, I provide a hanger suspended from the scale beam by hook $c$, provided with a swivel bearing, from which is suspended the platform frame. This hanger consists of a stem $d$ exteriorly threaded, to the lower end of which is fastened a horizontal supporting disk $d'$ which serves as a bearing head for the antifriction bearing hereinafter described.

The supporting disk $d'$ is preferably made with a sleeve $d^2$ and the disk and sleeve are screwed upon the threaded stem $d$, and locked in place by a lock screw $d^3$. At the upper end of the stem $d$ is a cross head $d^4$, provided at each end with an upright $d^5$ extending upwardly from the cross head. The uprights $d^5$ are preferably screw-threaded. Extending between the uprights $d^5$ is a yoke $d^6$, the ends of which are made with rings or collars which slip over the uprights $d^5$ so that the yoke $d^6$ is adjustable vertically thereon, and is held in the desired position of adjustment by nuts $d^7$ screwed on to the uprights $d^5$ above the yoke. The hook $c$ engages the yoke $d^6$ and supports the hanger.

The parts of the hanger thus far described may be considered as together constituting one member of the hanger, which member is not revoluble. Revolubly mounted on said non-revoluble member is another bearing member, herein shown as an annular bearing disk $d^8$, surrounding the stem $d$ and sleeve $d^2$. Between the non-revoluble bearing disk $d'$ and the revoluble bearing disk $d^8$ are the roller or ball bearings $d^9$.

The top bars B of the platform frame rest upon the bearing disk $d^8$ and are secured thereto by screws or rivets, so that the platform frame is supported by the revoluble member of the hanger and may be freely revolved relatively to the scale beam without putting any appreciable strain or twist or wear on the knife edge pivots $a$ and $a'$ of the scale beam. The top bars B are oppositely curved, as shown at $b$, to fit around the stem $d$ and sleeve $d^2$, thus reducing the extent of separation of the main body of bars B, which are seated on opposite sides of the stem $d$.

$b'$ is a washer between the tops of sleeve $d^2$ and the curved parts $b$, and a shoulder or stem $d$.

The height of the scale platform with relation to the scale beam and the floor may be adjusted by adjusting the yoke $d^6$ on the uprights $d^5$, which in effect lengthens or shortens the hanger, as desired.

I claim:

1. In combination, a scale beam, a platform frame, a hanger by which said platform frame is supported from said scale beam, and a swivel in said hanger between said beam and frame, said hanger having a pair of uprights and a yoke adjustably secured to said uprights, by which the hanger is suspended from said beam.

2. In combination, a scale beam, a hanger depending therefrom, said hanger comprising a non-revoluble member having a stem, a bearing head at the lower end of said stem, and a revoluble bearing member surrounding said stem and bearing on said head, and a platform frame suspended from said revoluble bearing member, the top member of said platform frame comprising two angle bars resting on said revoluble bearing member, one at each side of said stem, said angle bars being oppositely curved around said stem, to reduce the extent of the separation of the bars by the stem.

3. A hanger for supporting a platform frame from a scale beam, comprising a stem, a horizontal bearing head at the lower end of said stem, a revoluble bearing member mounted on said head around the stem, a cross head at the upper end of said stem, a pair of uprights extending upward from said cross head, and a yoke extending between and secured upon said uprights.

4. A hanger for supporting a platform frame from a scale beam, comprising a stem, a horizontal bearing head at the lower end of said stem, a revoluble bearing member mounted on said head around the stem, a cross head at the upper end of said stem, a pair of uprights extending upward from said cross head, a yoke between said uprights and vertically adjustable thereon, and means to secure said yoke in adjusted position upon said uprights.

Signed by me at Boston, Massachusetts, this 24th day of February, 1912.

THEODORE L. KEPPLER.

Witnesses:
CHARLES D. WOODBERRY,
ROBERT CUSHMAN.